United States Patent [19]
Haefner et al.

[11] 3,940,001
[45] Feb. 24, 1976

[54] RECYCLABLE PLASTIC CONTAINERS

[75] Inventors: Albert J. Haefner; Michael E. Kucsma, both of Baton Rouge, La.

[73] Assignee: Ethyl Corporation, Richmond, Va.

[22] Filed: May 6, 1974

[21] Appl. No.: 467,144

Related U.S. Application Data

[63] Continuation-in-part of Ser. No. 295,515, Oct. 6, 1972, abandoned.

[52] U.S. Cl. ............ 215/1 C; 215/12 R; 220/63 R; 229/3.5 R
[51] Int. Cl.² .................... B65D 23/02; B65D 25/14
[58] Field of Search ........ 215/1 C, 12 R; 229/3.5 R, 229/14 B; 220/9 M, 63 R

[56] References Cited
UNITED STATES PATENTS

| | | | |
|---|---|---|---|
| 2,781,551 | 2/1957 | Richerod | 215/1 C X |
| 3,282,729 | 11/1966 | Richardson | 215/1 C X |
| 3,298,559 | 1/1967 | Lurie | 220/63 R |
| 3,561,629 | 2/1971 | Turner | 215/1 C |

*Primary Examiner*—Donald F. Norton
*Attorney, Agent, or Firm*—Donald L. Johnson; John F. Sieberth; David L. Ray

[57] ABSTRACT

A recyclable blow molded, injection blow molded or injection molded plastic container having laminated walls that include a frangible load-bearing lamina and a non-frangible fluid-barrier lamina which can be easily separated from each other in a crushing operation and recycled to make another container.

40 Claims, 7 Drawing Figures

RECYCLABLE PLASTIC CONTAINERS

CROSS REFERENCE

This case is a Continuation-in-part of pending application Ser. No. 295,515, filed Oct. 6, 1972 and now abandoned.

BACKGROUND OF THE INVENTION

1. Field of the Invention

The present invention relates to recyclable, rigid, plastic, packaging containers which are highly resistant to gas permeation and water vapor transmission. The containers may be made in the form of pipes, bottles, barrels, tubs, cans, trays and the like. They are formed by means of blow molding, injection blow molding and injection molding techniques.

2. Description of the Prior Art

Rigid plastic containers are finding an ever increasing use in packaging articles of commerce. In particular, the field of food and beverage packaging in plastics is increasing at a very rapid rate. Food products such as milk, syrups, fruit juices, instant coffee and tea, peanut butter, margarine, mayonnaise, dips, prepared salads, condiments and other food products are found on today's grocery shelves in rigid plastic containers. Rigid plastic containers also find wide use in the packaging of cosmetics, such as skin lotions, shampoos, ointments, etc., and in the parmaceutical field are used for packaging many drugs.

In order to provide a suitable package for the many commodities purchased by the general public, a plastic container must have the requisite rigidity, strength and impermeability. The container must be sufficiently rigid to be handled on conventional high speed filling and capping lines and to be handled during shipment and by the ultimate consumer during use. The plastic container must also be sufficiently strong to contain the product, particularly if the product is under pressure as in the case of carbonated beverages. Strength is also an important factor in that the container should be resistant to breakage during filling, transporting and use by the consumer. Impermeability to fluids (water, oxygen, carbon dioxide, etc.) is important for packaging of foods and carbonated beverages. In order to achieve widespread commercial acceptance, a plastic container must be inexpensive, be attractive in appearance, and be capable of manufacture by conventional high speed plastic container manufacturing equipment, in particular, by blow molding, injection blow molding or injection molding. A third and ever increasingly important requirement for a plastic container is that it be ecologically acceptable.

As a practical matter, plastic containers presently in use do not meet all the criteria found above. Many containers have the required rigidity and strength and are inexpensive, such as those made from high and low density polyethylene, polyvinyl chloride and oriented polypropylene. However, these containers do not provide the desired impermeability which is required in packaging many products, e.g., carbon dioxide-containing beverages, oxygen-sensitive foods, etc. On the other hand, plastic materials having the requisite impermeability properties, e.g., polyvinylidene chloride polymers, nitrile-containing polymers, are relatively expensive or cannot be readily fabricated into containers by extrusion-based methods or do not possess the necessary strength or desirable optical properties, such as high impact strength, creep resistance, transparency, or the like.

In order to overcome the deficient properties of the individual thermoplastic materials, the prior art has taught the desirability of producing a blow molded container by coextruding two different plastic materials, each having certain desired properties, to form a composite parison and then blow molding this parison in a hollow blow mold to produce small-neck containers. See U.S. Pat. No. 2,710,987. In order to overcome some of the strength deficiencies in blow molded plastic containers, U.S. Pat. No. 3,140,004 describes the fabrication of a blow molded, multilayer, plastic container utilizing two plastic materials having different coefficients of thermal contraction. U.S. Pat. No. 3,082,484 describes a method of forming a container wherein one of the thermoplastics used has such a low viscosity that it cannot be extruded into a parison for blow molding. Nylon, which normally cannot be blow molded alone, is encased in a polyethylene jacket to produce a container having the desirable characteristics of both nylon and polyethylene. French Pat. No. 1,423,666 describes the preparation of blow molded plastic containers from two or more plastic materials by coextruding a parison having one layer of a vinyl halide polymer or copolymer, or an olefinic polymer, and the other layer of a vinylidene chloride polymer. According to U.S. Pat. No. 3,449,479, a preformed parison of a polyolefin is coated with a chlorine-containing polymer, e.g., polyvinyl chloride, polyvinylidene chloride-acrylonitrile copolymers, by solution or powder coating techniques. The coated parison is then oriented and converted into a bottle in a blow molding operation.

Methods for producing multilayered plastic containers by plastic forming techniques other than blow molding, injection molding and injection blow molding are disclosed in British Pat. No. 1,238,577 and Netherlands Application 71/15611. In the British patent, a laminated sheet composed of a load-carrying lamina and a fluid-barrier lamina is subjected to a compression forming operation. The method of the Netherlands application involves thermoforming a multilayer, laminated sheet of plastic material, one lamina of which is a high barrier thermoplastic such as Barex 210, the other being polystyrene.

While many combinations of materials and processes for producing multilayer plastic containers have been suggested heretofore, these containers have not found significant acceptance commercially in large volume applications. One of the primary reasons is believed to be excessive production costs. For example, in most blow molding machines used commercially today, waste neck and tail scrap is produced in significant quantities. The scrap presents no problem when bottles are made from a single-layer parison, since the neck and tail scrap portions can be reground and recycled into the thermoplastic feed material. However, as far as is known, heretofore there has been no commerically feasible way to recycle the tail or neck scrap produced when blow molding multilayer bottles. Since most of the multilayer bottles are made from parisons in which the two or more layers are strongly bonded, these thermoplastic materials cannot be separated for refeeding to the respective resin feeds. See, for example, U.S. Pat. No. 3,449,479. Attempts to feed multilayer scrap regrind have been unsuccessful in that the most commonly used barrier resins are incompatible with the other thermoplastic resins used for the load-bearing lamina, resulting in bottles which are hazy, weak and commercially unacceptable.

From an ecological standpoint, the multilayer bottles produced by the processes taught in the prior art are not suitable for recycling to produce recovered resin for reuse in producing bottles. Because the problem of separating the barrier layer from the load-bearing layer has not been heretofore solved, there has been no economic incentive to return multilayer plastic bottles to separation centers for recovery of the plastic materials therein for reprocessing into new plastic bottles.

SUMMARY OF THE INVENTION

It is an object of the present invention to provide a blow molded, injection blow molded, or injection molded plastic container having multiple layers which can be readily separated into the components of each layer.

It is a further object of the present invention to provide a blow molded, injection blow molded, or injection molded plastic container which is recyclable.

It is another object of the present invention to provide a rigid, strong, impermeable, economical, plastic container which can be produced by blow molding, injection molding, or injection blow molding and wherein the resultant container can be recycled.

A particular object of this invention is to provide a rigid, strong, impermeable, economical, transparent, narrow-necked, blow molded bottle capable of being recycled.

The present invention provides a multilayer plastic container which can be made by blow molding, injection blow molding or injection molding wherein there is provided little or no adhesion between the layers of the laminated container. The container has a load-bearing lamina made from a frangible, rigid, low-cost, thermoplastic material and an adjacent layer of a non-frangible, thin, flexible, high barrier, thermoplastic material having excellent resistance to permeation by carbon dioxide and oxygen. The containers have good clarity and provide outstanding burst, impact, creep, and tensile strength.

Because of the frangible nature of the load-bearing lamina and the elastic, coherent nature of the non-frangible barrier lamina, the containers of the present invention can be separated into their respective plastic components by subjecting the container to crushing and screening or other physical separation techniques, whereby the components of the container may be recycled. Additionally, when producing the containers by the parison blow molding technique, the tail and neck scrap produced can be crushed and separated into their plastic components for recycle, thus, lowering the cost of the container and avoiding the addition of waste plastic material required to be disposed of by land fill or incineration.

Containers of the present invention are particularly suited for use in the food and beverage industry, e.g., in the form of narrow-necked bottles for carbonated beverages and beer. The containers produced in accordance with the teachings of this invention have sufficient strength, permeability and aesthetic characteristics to qualify them for exacting packaging roles and are capable of being recycled.

Accordingly, one embodiment of this invention involves the provision of a rigid, narrow-necked, plastic bottle having laminated walls, the laminated walls comprising a fluid-barrier lamina of a flexible, non-frangible material which is highly impermeable to fluids and a load-bearing lamina of a frangible plastic material which will delaminate from said fluid-barrier lamina when said bottle is crushed. A feature of this embodiment is the fact that because such bottles are manufactured by blow molding, injection blow molding, or injection molding techniques, the sidewalls of the bottle are seamless. This greatly enhances the attractiveness of the bottles, particularly the transparent bottles. In addition, the lack of any seams in the sidewalls enhances the overall strength characteristics of the bottle.

Particularly preferred rigid, narrow-necked, plastic bottles having the above described laminated wall construction are those in which the walls are composed of two laminae, the load-bearing lamina being on the outside of the bottle and the fluid-barrier lamina being on the inside of the bottle, said laminated walls having an oxygen permeability of no more than 6.5 cc-mils/100 sq. in./24 hrs/atmos. at 73°F., a water permeability of no more than 8.0 g-mils/24 hrs/100 sq. in. at 73°F., and a carbon dioxide permeability of no more than 20 cc-mils/24 hrs/100 sq. in./atmos. at 73°F.

Another embodiment of this invention relates to the provision of a rigid blow molded plastic container having laminated walls, the laminated walls comprising a fluid-barrier lamina of a flexible, non-frangible material which is highly impermeable to fluids and a load-bearing lamina of a frangible plastic material which will delaminate from said fluid-barrier lamina when said container is crushed. Preferred blow molded plastic containers of this invention include bottles, particularly transparent bottles, narrow-necked bottles and bottles having a threaded neck.

Still another embodiment of this invention involves the provision of a rigid, injection blow molded, plastic container having laminated walls, the laminated walls comprising a fluid-barrier lamina of a flexible, non-frangible material which is highly impermeable to fluids and a load-bearing lamina of a frangible plastic material which will delaminate from said fluid-barrier lamina when said container is crushed. Preferred containers of this type include bottles, especially narrow-necked bottles, tubs and can-shaped containers.

A further embodiment of this invention involves the provision of a rigid injection molded plastic container having laminated walls, the laminated walls comprising a fluid-barrier lamina of a flexible, non-frangible material which is highly impermeable to fluids and a load-bearing lamina of a frangible plastic material which will delaminate from said fluid-barrier lamina when said container is crushed. Preferred containers of this type include bottles, especially those with threaded necks, jars, tubs and can-shaped containers.

Yet another embodiment of this invention is a process for making a plastic container having laminated walls, comprising extruding a laminated parison, which parison includes a frangible, load-bearing lamina and a non-frangible, fluid-barrier lamina, the laminae having low adhesion therebetween, and blow molding a container from the parison. In order to achieve enhanced strength properties in a finished container, it is preferred to orient the parison prior to or during the blow molding step.

A still further embodiment of this invention relates to the provision of a process for making a plastic container having laminated walls, comprising injection molding a first homogeneous parison of a first material, injection molding a second homogeneous parison of a second material over the outside of the first parison to form a laminated parison, cooling the laminated parison to a temperature range wherein the laminated parison can be blown, and blowing the laminated parison in a mold, one of the first and second materials being, at ambient temperature, a flexible, non-frangible material which is highly impermeable to fluids, the other of the materials being, at ambient temperature, a frangible material having low adhesion to the non-frangible material. To achieve enhanced strength in the finished container, it is desirable to orient the laminated parison prior to or during the blowing step. Accordingly, this constitutes a particularly preferred embodiment of the invention.

Other embodiments, features, advantages and characteristics of this invention will be still further apparent from the ensuing description, appended claims, and accompanying drawings.

DESCRIPTION OF THE PREFERRED EMBODIMENTS

Figure 1:
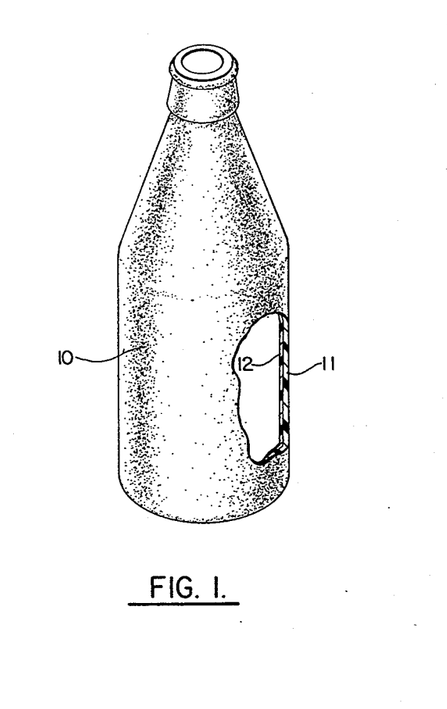
FIG. 1 is a partly sectional, perspective, elevational view of a laminated plastic bottle.

Referring now to the drawings, in FIG. 1 is shown a bottle 10 constructed in accordance with the present invention. The bottle is made from a two-layered laminate composed of an inner fluid-barrier lamina 12 made from a flexible and resilient thermoplastic and an outer load-bearing lamina 11 made from a frangible thermoplastic. Fluid-barrier lamina 12 is selected for its high impermeability to fluids such as gases and water and its lack of frangibility, and the load-bearing lamina 11 is selected for its load-bearing properties and its frangibility.

Figure 2:
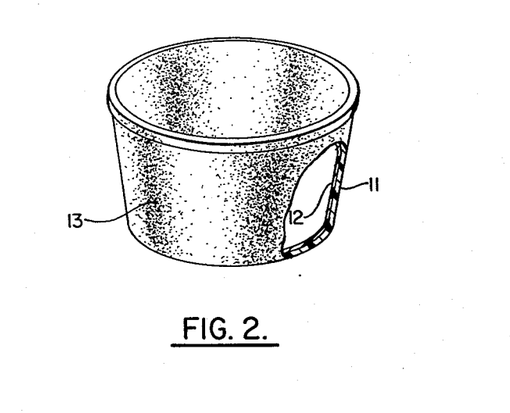
FIG. 2 is a partly sectional, perspective, elevational view of a laminated plastic bowl or tub.

In FIG. 2 is shown a bowl or tub 13 made from a two-layered laminate. Bowl 13 is composed of an inner fluid-bearing lamina 12 and an outer load-bearing lamina 11.

Figure 3:
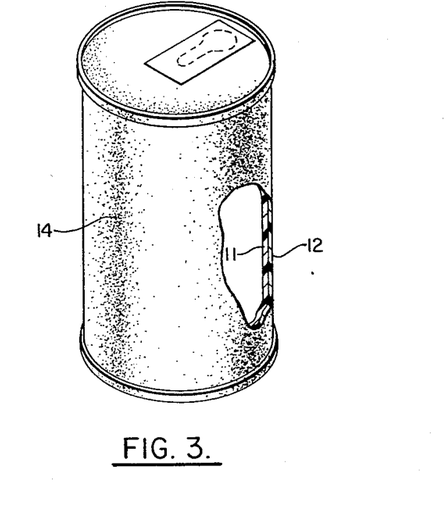
FIG. 3 is a partly sectional, perspective, elevational view of a laminated carbonated beverage container.

A can-shaped container 14, suitable for a carbonated beverage or beer, is shown in FIG. 3. Can-shaped container 14 has an inner load-bearing lamina 11 and an outer fluid-barrier lamina 12.

Figure 4:
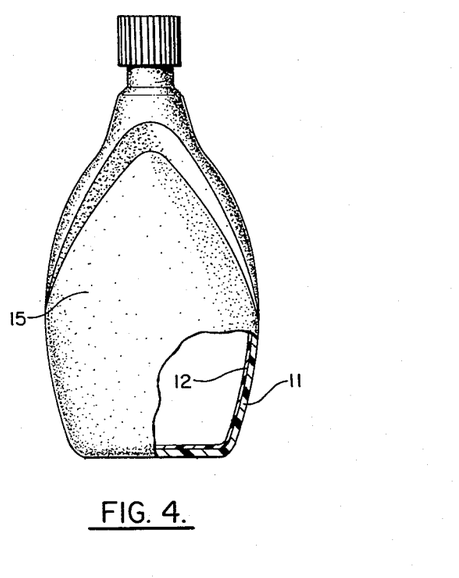
FIG. 4 is a partly sectional, perspective, elevational view of a laminated cosmetic bottle.

Another type of container 15 in the form of a bottle with a screw cap is shown in FIG. 4. Such a container can be used to hold cosmetics such as lotions and liquid creams. The bottle 15 is made of a two-layer laminate composed of an inner fluid-barrier lamina 12 and an outer load-bearing lamina 11. Other containers may be made in accordance with the present invention in any shape or form desired.

Figure 5:
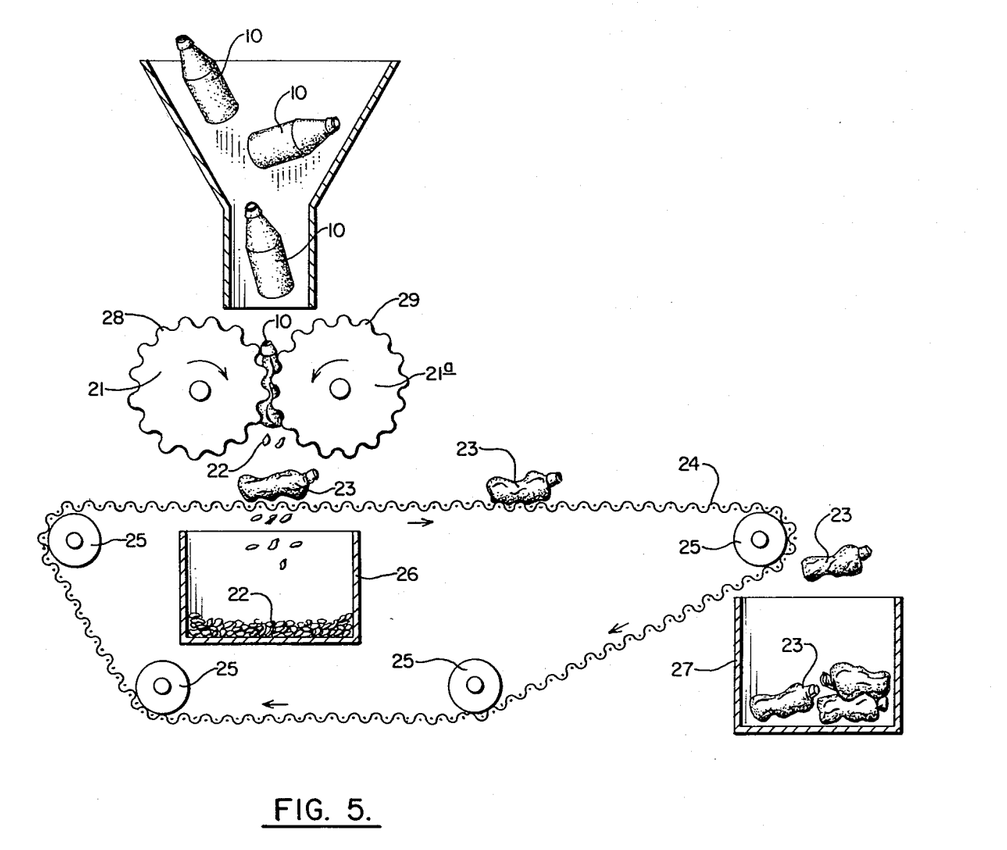
FIG. 5 is a schematic, partly cross-sectional view of a bottle crushing and delaminating apparatus.

In FIG. 5 is shown an apparatus for crushing bottles 10 or any other laminated container of the present invention such as containers 13, 14 and 15 disclosed in FIGS. 2, 3 and 4, respectively. The containers 10 are placed in hopper 20 and fall onto crushing rollers 21 and 21a. The crushing rollers 21 and 21a have teeth 28 and 29 thereon for crushing the bottles 10 or other containers. Since the load-bearing lamina is formed from a frangible plastic material, it breaks into chips 22 which fall through holes in conveyor belt or screen 24 into bin 26. Because the separated fluid-barrier lamina 23 is made from material which is non-frangible and flexible, it does not break, but retains its integrity when bottle 10 passes through rollers 21 and 21a. The deformed fluid-barrier lamina 23 is carried by the conveyor belt screen 24 to bin 27. Conveyor belt screen 24 travels along rollers 25. The separated chips 22 of the load-bearing lamina in bin 26 and the deformed fluid-barrier lamina 23 in bin 27 can be recycled to form additional composite bottles.

Figures 6, 7:
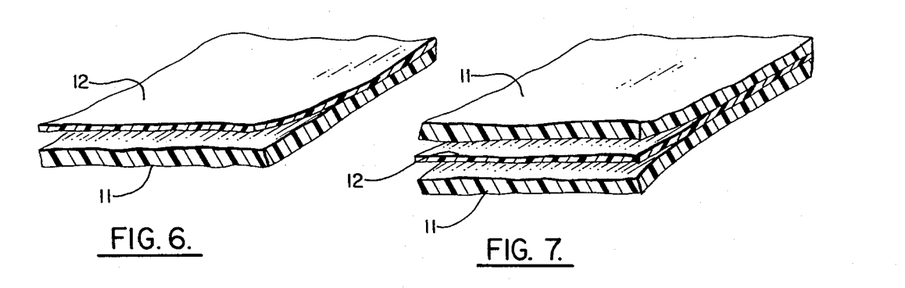
FIG. 6 is a partly sectional, enlarged, perspective view of a portion of a two-layer laminate.
FIG. 7 is a partly sectional, enlarged, perspective view of a portion of a three-layer laminate.

FIGS. 6 and 7 illustrate the laminar construction of a two-layer and three-layer container wall, respectively. In addition, these figures schematically depict the low adhesion between the laminae. Upon deforming or crushing a container such as bottle 10 depicted in FIG. 5, the load-bearing lamina 11 breaks up into small pieces and separates readily from fluid-barrier lamina 12, as shown in FIG. 6, due to the frangible nature of lamina 11 and the low adhesion between the layers.

The fluid-barrier lamina 12 can be on the inside or outside of the container, or it may be sandwiched between two or more load-bearing lamina. As can be seen in the drawings, FIGS. 1, 2 and 4 shown fluid-barrier lamina 12 on the inside of the container, and FIG. 3 shows the fluid-barrier lamina on the outside of the container. FIG. 7 shows a partially delaminated fluid-barrier lamina 12 contained between two partially delaminated load-bearing lamina 11.

The reference to the lamina 11 as being "load-bearing" does not mean that lamina 12 has no load thereon. This simply means that lamina 11, due to its greater thickness than that of lamina 12, is necessarily stronger and will bear a greater proportion of a load placed on a container. Lamina 11 should be approximately 3 to 10 times as thick as fluid-barrier lamina 12 to realize maximum savings due to the lower cost of load-bearing lamina 11 than that of fluid-barrier lamina 12. Parisons or blanks used to blow mold or form containers by similar methods should have a fluid barrier lamina which is also about 3 to 10 times as thick as the load-bearing lamina. The load-bearing lamina 11 may be any suitable frangible plastic material which has good mechanical properties. Such materials are, in general, rigid thermoplastic polymers which have the necessary strength properties to be molded into bottles and like containers which can withstand the rigors of actual usage such as filling, capping, pressurizing, printing, labelling, handling, jarring, dropping and so forth, but which are brittle enough so that when the container is subjected to a crushing force well in excess of that likely to be encountered in actual service, the polymer will break up into relatively small pieces. Exemplary plastic materials for load-bearing lamina 11 include, in general, polymers having relatively low impact strength (e.g., those which have a notched Izod impact strength of less than about 0.5 ft. lb. per inch of notch) such as polyvinyl chloride, copolymers of vinyl chloride, e.g., vinyl chloride-vinyl acetate, polyvinylidene chloride copolymers, styrene-acrylonitrile copolymers, polystyrene, acrylic polymers and similar frangible thermoplastic materials.

Flexible, non-frangible thermoplastic polymers having low permeability to fluids are used for fluid-barrier lamina 12. Suitable thermoplastics having high barrier properties include polymers containing at least 50 wt. percent of polymeric nitrile material wherein one or more monomers of the formula $$CH_2=C(X)-CN$$

where X is hydrogen, halogen or an alkyl group having up to four carbon atoms are copolymerized with one or more α-olefinic comonomers. Suitable α-olefinic comonomers are:

I. Esters having the structure $$CH_2=C(R_1)-COOR_2$$

wherein $R_1$ is hydrogen, an alkyl group having from 1 to about 4 carbon atoms or a halogen, and $R_2$ is an alkyl group having from 1 to about 8 carbon atoms.

II. Alpha olefins (vinyl olefins) of the formula $$H_2C=C(R_3)(R_4)$$

wherein $R_3$ is hydrogen, an alkyl group having from 1 to about 6 carbon atoms or a cycloalkyl group of up to about 8 carbon atoms, and $R_4$ is hydrogen or an alkyl group of up to about 4 carbon atoms.

III. Aromatic olefins of the formula $$H_2C=C(R_5)(R_6)$$

wherein $R_5$ is an aromatic radical of 6 to about 10 carbon atoms which may contain halogen or alkyl groups attached to the aromatic nucleus and $R_6$ is hydrogen, halogen (e.g., chlorine), or a methyl group.

IV. Vinyl ethers represented by the formula $$H_2C=CHOR_7$$

wherein $R_7$ is a monovalent aliphatic, cycloaliphatic or aromatic group preferably containing up to about 10 carbon atoms; e.g., an alkyl group, a cycloalkyl group, an aralkyl group (benzyl, phenetyl, etc.), an aryl group, or the like.

V. Halogenated alpha olefins of the formula $$H_2C=C(Y)(R_8)$$

wherein Y is halogen, preferably chlorine or bromine, and $R_8$ is hydrogen, halogen, an alkyl group of up to about 6 carbon atoms or a halo-alkyl group of up to about 6 carbon atoms.

VI. Vinyl esters having the structure $$H_2C=CHOC(=O)-R_9$$

wherein $R_9$ is hydrogen, alkyl groups of from 1 to 10 carbon atoms, aryl groups of from 6 to 10 carbon atoms including the carbon atoms in ring substituted alkyl substituents.

Comonomers of Types I and III above are preferred.

Exemplary of the foregoing copolymers are acrylonitrile copolymerized with methyl acrylate, ethyl acrylate, propyl acrylate, isopropyl acrylate, the butyl acrylates, methyl methacrylate, ethyl methacrylate, propyl methacrylate, isopropyl methacrylate, the butyl methacrylates, alpha chloro-acrylate, vinyl acetate, vinyl formate, vinyl propionate, ethylene, propylene, isobutylene, 1-pentene, 3-methyl-1-pentene, 4-methyl-1-pentene, vinyl chloride, vinyl bromide, vinylidene chloride, styrene, alpha methylstyrene vinyl ethyl ether, vinyl propyl ether, vinyl hexyl ether, vinyl cyclohexyl ether, vinyl benzyl ether, 4-chloro styrene, 4-bromo styrene, 2,4-dimethyl styrene, and the like. Similar copolymers in which the acrylonitrile is partially or totally replaced by methacrylonitrile are also exemplary copolymers which may be used in fabricating the fluid barrier lamina. Generally speaking, copolymers based on acrylonitrile will contain up to about 90 mole percent of polymerized acrylonitrile whereas copolymers of methacrylonitrile may contain as much as about 98 to 99 mole percent of this nitrile monomer.

Particularly suitable polymers of this type are made by polymerizing a major portion of the nitrile monomer (e.g., acrylonitrile) and a minor portion of an ester of an olefinicially unsaturated carboxylic acid (e.g., methyl acrylate). Preferred copolymers result from the polymerization of at least 70 wt. percent, typically 70 to 95 wt. percent, of a mononitrile of the above formula with up to 30 wt. percent, typically 5 to 30 wt. percent, based on the combined weight of these monomers of an ester of the formula $$CH_2=C(X)-COOR$$

where X is as defined above and R is an alkyl group having from 1 to 2 carbon atoms.

Another type of polymeric nitrile material which may be used in lamina 12 is a polymer in which a mixture of nitrile monomers is copolymerized with one or more α-olefinic comonomers such as styrene, methyl acrylate, ethyl acrylate, methyl methacrylate, etc. At least 50 percent by weight, typically 50 to 95 percent by weight, of this mixture of nitrile monomers is a substance of the formula $$CH_2=C(X)-CN$$

wherein X has the foregoing designation. The balance of the nitrile monomer mixture, typically 5 to 50 percent by weight, is a dicyanobutene monomer, such as 1,3-dicyano-1-butene, 1,4-dicyano-1-butene, or 2,4-dicyano-1-butene, or a mixture of two or more of these isomers.

The foregoing thermoplastic nitrile polymeric materials suitable for use in lamina 12 may be formed by any of the generally known techniques of polymerization, such as bulk polymerization, solution polymerization, and emulsion or suspension polymerization. Further, the polymerization may be conducted in the presence of a homopolymer or a copolymer of a conjugated diene monomer such as, for example, butadiene and isoprene, to increase the impact strength of the resulting composition. An exemplary process is described in U.S. Pat. No. 3,426,102.

Polymeric materials suitable for fluid-barrier lamina 12 are disclosed in U.S. Pat. Nos. 3,426,102; 3,451,538; 3,540,577; 3,580,974; 3,586,737; and 3,615,710, all of which are hereby incorporated by reference. British Pat. Nos. 1,185,306; 1,185,307; and 1,185,308 also disclose suitable barrier materials.

It is important that the adhesion between laminae 11 and 12 be sufficiently low so that separation occurs between the respective laminae when the laminated container or laminated scrap is subjected to a crushing force causing breakup of frangible lamina 11.

To manufacture plastic containers in accordance with this invention, recourse may be had to previously known blow molding, injection blow molding and injection molding techniques. For example, in performing a blow molding process in accordance with this invention, one may utilize techniques such as those described in U.S. Pat. Nos. 3,079,637 and 3,140,004. Injection blow molding techniques which may be utilized in the practice of this invention are exemplified by the teachings of U.S. Pat. No. 3,011,216. Illustrative techniques which may be applied in the manufacture of containers by injection molding are those described in U.S. Pat. No. 3,454,991.

It is preferred that the plastic container be oriented to improve its properties and characteristics, especially physical strength. Orientation is well known in the art. See U.S. Pat. Nos. 3,288,317 and 3,311,684 which are hereby incorporated herein by reference. Orientation is generally accomplished by stretching an article under temperature conditions maintained at a level sufficiently above the glass transition temperature of the article to permit stretching and achieve orientation.

A preferred method of orientation is to extrude a double-walled parison having a load-bearing wall in intimate contact with or laminated to a fluid-barrier wall, cause or allow the parison to cool to a temperature where the polymer can be oriented by elongation or stretching, and blow molding the parison to form a bottle or other container. Such a method is sometimes referred to as two-step, or cold parison, extrusion blow molding.

Another preferred method of achieving orientation when producing containers by injection blow molding is set forth in U.S. Pat. No. 3,470,282, the disclosure of which is hereby incorporated herein by reference. In this patent, a biaxially oriented, thermoplastic container-shaped article is prepared by (a) injection molding a homogeneous melt to form a hollow body or parison, (b) cooling the body to a temperature range wherein the thermoplastic can be biaxially oriented by stretching and inflating, and (c) stretching the cooled body along its longitudinal axis and inflating it radially with respect to such longitudinal axis so as to obtain uniform biaxial orientation of the thermoplastic body. An additional step necessary to injection blow mold the laminated containers of the present invention is to injection mold a second homogeneous melt over the outside or inside of the hollow body or parison injection molded in step (a) to form a laminated hollow body or parison, then to cool the body as in step (b) and stretch and inflate the body as in step (c).

The required degree of oxygen permeability and water vapor permeability in a container will vary with the particular product to be packaged and the storage conditions, e.g., temperature, humidity, ventilation, light type and intensity, etc. For certain packaging applications involving foods, medicines or carbonated beverages, it is desirable to furnish a container having an oxygen permeability of not more than 6.5 cc/100 sq. in /24 hrs/atmos./mil at 73°F., a water permeability of not more than 8.0 g/24 hrs/100 sq. in./mil at 100°F., and a carbon dioxide permeability of not more than 8.0 g/24 hrs/100 sq. in./atmos/mil at 73°F. This is illustrated in Modern Packaging, March 1965, "Flexible-Vacuum Performance," page 201 et. seq., wherein the extreme sensitivity of coffee to moisture and oxygen is discussed. The authors of this article state that an increase in the moisture content of coffee of about 1 percent, i.e., from 1.4 to 2.6 percent will cause a stale odor after 20 days, while only 14 cc of oxygen will cause staling in 1 pound of coffee.

EXAMPLE

Two different extruders were connected to a coaxial parison extrusion die. The load-bearing lamina, polystyrene, was extruded by a 2-½ inch Prodex extruder, manufactured by the Prodex Corp., having a feed screw with length to diameter ratio of 24:1. A single stage screw was used having a 2.2:1 compression ratio. The Prodex extruder barrel was operated to provide four temperature zones. Zone No. 1 had a temperature of 340°F., Zone No. 2 had a temperature of 360°F., Zone No. 3 had a temperature of 375°F., and Zone No. 4 had a temperature of 400°F. An adapter was used for connecting the 2-½ inch diameter extruder outlet of the Prodex extruder to the ¾ inch die inlet hole of the coaxial die. The adapter was maintained at a temperature of 400°F. and the coaxial die was also maintained at 400°F.

The fluid-barrier lamina was extruded on a 1-½ inch NRM extruder having a feed screw with a ratio of length to diameter of 20:1. The NRM extruder had a single stage screw and a compression ratio of 3:1. The NRM extruder barrel was operated to provide two temperature zones, the first at 340°F. and the second at 370°F. An adapter was used to connect the 1-½ inch die outlet hole of the NRM extruder to the ¾ inch inlet hole of the coaxial die. The adapter was maintained at a temperature of 400°F.

As previously stated, the load-bearing lamina was polystyrene. The fluid-barrier lamina was a composition resulting from the polymerization in aqueous medium of acrylonitrile and methyl acrylate in the presence of a copolymer of butadiene and acrylonitrile pursuant to the teachings of U.S. Pat. No. 3,426,102. Such a product is at present commercially available from Vistron Corporation, a subsidiary of The Standard Oil Company, Cleveland, Ohio, under the registered trademark BAREX 210.

Two-layer parisons having an outside diameter of about one inch were extruded from the coaxial die. The fluid-barrier inner lamina was about 30 mils in thickness and the polystyrene outer lamina was about 100 mils thick. The parisons consisted of an interior cylinder of fluid-barrier lamina and an outer cylinder of polystyrene. The parisons were allowed to cool to room temperature, then reheated to about 275°F., and bottles similar to that shown in FIGS. 1 and 2 were blow molded from the heated parisons.

laminate of the present invention. However, no measurements could be obtained since the portions would delaminate while they were being placed in the holder of the tester. This indicated extremely low adhesion between the laminae.

TABLE II

THEORETICAL O₂ TRANSMISSION

| Material for Composite | Wall Thickness of Bottle (mm) | Percent Barrier Material | Permeability (cc/100 in²/ATM per 24 hr/mil) | Bottle Transmission (cc/100 in²/ATM per 24 hr) |
|---|---|---|---|---|
| Barrier material/styrene | 25 | 20 | 4 | 0.16 |
| Barrier material/styrene | 16 | 25 | 3.2 | 0.2 |
| Barrier material/styrene | 25 | 16 | 4.9 | 0.196 |
| Barrier material/styrene | 33 | 20 | 4 | 0.121 |
| Styrene | 25 | — | > 200 | > 8 |
| PVC* (unmod.) | 25 | — | 6.5 | 0.26 |
| PVC* (mod.) | 25 | — | 11 | 0.44 |
| Barrier material | 25 | 100 | 0.8 | 0.032 |

THEORETICAL CO₂ TRANSMISSION

| Material for Composite | Wall Thickness of Bottle (mm) | Percent Barrier Material | Permeability (cc/100 in²/ATM per 24 hr/mil) | Bottle Transmission (cc/100 in²/ATM per 24 hr) |
|---|---|---|---|---|
| Barrier material/styrene | 25 | 20 | 5.5 | 0.22 |
| Barrier material/styrene | 16 | 25 | 4.5 | 0.282 |
| Barrier material/styrene | 25 | 16 | 6.9 | 0.276 |
| Barrier material/styrene | 33 | 20 | 5.5 | 0.167 |
| Styrene | 25 | — | 900 | 36 |
| PVC* (unmod.) | 25 | — | 13 | 0.52 |
| PVC* (mod.) | 25 | — | 34 | 1.36 |
| Barrier material | 25 | 100 | 1.1 | 0.043 |

* Polyvinyl chloride

The fluid-barrier lamina of the bottles had a thickness of from about 6 to about 8 mils and the polystyrene lamina had a thickness of about 17 to about 22 mils. The bottles were oriented in the transverse direction by the stretching at 275°F. during blow molding.

A randomly selected empty sample bottle was dropped from a height of 18 inches several times with only occasional insignificant cracks appearing in the styrene. Other empty sample bottles were also dropped from heights of 3 feet, 6 feet, and 8 feet, with chippage and breakage occurring from each drop, but the fluid-barrier lamina did not break and therefore, any fluids contained in the bottle would not leak out. A section was cut from each one of a number of sample bottles which were blow molded at different temperatures. The two laminae were separated and were found to have the following physical properties.

TABLE I

| Fluid Barrier Tensile Properties | Blow Molding Temperatures | | |
|---|---|---|---|
| | *250°F. | *273°F. | *300°F. |
| Tensile yield, psi | 15,700 | 9,000 | 9,000 |
| Elastic modulus | 936,000 | 705,000 | 650,000 |
| Polystyrene Tensile Properties | | | |
| Tensile yield, psi | 10,360 | 9,290 | 9,120 |
| Elastic modulas | 648,000 | 723,000 | 559,000 |

*The temperatures referred to in Table I indicate the temperatures at which the various bottles were blow molded.

Based upon the oxygen transmission and carbon dioxide transmission of polystyrene and barrier material 12, theoretical O₂ and CO₂ transmission data were calculated and tabulated as shown in Table II on page 22.

Attempts were made to insert a portion of a randomly selected bottle into the holder of an Instron Universal Tester made by the Instron Corp. of Canton, Massachusetts, to determine the peel strength of the As used herein, the terms "blow molded" and "blow molding" are synonymous with the terms "extrusion blow molded" and "extrusion blow molding" which are sometimes used in the art. The terms "blow molded" and "blow molding" as used herein are not intended to include "injection blow molded" or "injection blow molding."

What is claimed is:
1. A rigid narrow-necked plastic bottle having laminated walls, the laminated walls comprising:
    a. a fluid-barrier lamina of a flexible non-frangible material which is highly impermeable to fluids, and
    b. a load-bearing lamina of a frangible plastic material which will delaminate from said fluid barrier lamina when said bottle is crushed.
2. The bottle of claim 1 wherein the load-bearing lamina is on the outside of the bottle and the fluid barrier lamina is on the inside of the bottle.
3. The bottle of claim 1 wherein the load-bearing lamina is on the inside of the bottle and the fluid-barrier lamina is on the outside of the bottle.
4. The bottle of claim 1 wherein the fluid-barrier lamina is sandwiched between two or more load-bearing laminae.

5. The bottle of claim 1 wherein said load-bearing lamina has a thickness of 3 to about 10 times the thickness of the fluid-barrier lamina.

6. The bottle of claim 1 wherein the bottle has a threaded neck.

7. The bottle of claim 1 wherein the bottle is transparent.

8. The bottle of claim 1 wherein the laminated walls have an oxygen permeability of no more than 6.5 cc-mils/100 sq.in./24 hrs/atmos. at 73°F.

9. The bottle of claim 1 wherein the laminated walls have a water permeability of no more than 8.0 g-mils/24 hrs/100 sq. in. at 73°F.

10. The bottle of claim 1 wherein the laminated walls have a carbon dioxide permeability of no more than 20 cc-mils/24 hrs/100 sq. in. at 73°F.

11. The bottle of claim 1 wherein the laminated walls have an oxygen permeability of no more than 6.5 cc-mils/100 sq.in./24 hrs/atmos. at 73°F; a water permeability of no more than 8.0 g-mils/24 hrs/100 sq.in. at 73°F; and a carbon dioxide permeability of no more than 20 cc-mils/24 hrs/100 sq.in./atmos. at 73°F.

12. The bottle of claim 1 wherein the walls are composed of two laminae, the load-bearing lamina being on the outside of the bottle and the fluid-barrier lamina being on the inside of the bottle, said laminated walls having an oxygen permeability of no more than 6.5 cc-mils/100 sq.in./24 hrs/atmos. at 73°F, a water permeability of no more than 8.0 g-mil/24 hrs/100 sq.in. at 73°F, and a carbon dioxide permeability of no more than 20 cc-mils/24 hrs/100 sq.in./atmos. at 73°F.

13. A rigid blow molded plastic container having laminated walls, the laminated walls comprising:
a. a fluid-barrier lamina of a flexible non-frangible material which is highly impermeable to fluids, and
b. a load-bearing lamina of a frangible plastic material which will delaminate from said fluid-barrier lamina when said container is crushed.

14. The container of claim 13 wherein the container is a bottle.

15. The container of claim 13 wherein the container is a transparent bottle.

16. The container of claim 13 wherein the container is a narrow-necked bottle.

17. The container of claim 13 wherein the container is a bottle having a threaded neck.

18. The container of claim 13 wherein said fluid-barrier lamina comprises a polymer containing at least 50 percent by weight of a polymeric nitrile material formed from one or more nitrile monomers of the formula where X is hydrogen, a halogen, or an alkyl group having up to 4 carbon atoms and one or more alpha-olefinic comonomers.

19. The container of claim 18 wherein said polymer is a polymer formed in the presence of a homopolymer or copolymer of a conjugated diene monomer.

20. The container of claim 18 wherein said fluid-barrier lamina is a polymer containing at least 50 percent by weight of a polymeric nitrile material made from a mixture of nitrile monomers made up of (a) from about 50 percent to about 95 percent by weight of a monomer having the structure where X is hydrogen, a halogen, or an alkyl group having up to 4 carbon atoms, and (b) from about 5 percent to about 50 percent by weight of at least one dicyanobutene monomer selected from the group consisting of 1,3-dicyano-1-butene, 1,4-dicyano-1-butene, and 2,4-dicyano-1-butene.

21. The container of claim 20 wherein said polymer is a polymer formed in the presence of a homopolymer or copolymer of a conjugated diene monomer.

22. The container of claim 20 wherein said dicyanobutene material comprises a mixture of two or more isomers selected from the group consisting of 1,3-dicyano-1-butene, 1,4-dicyano-1-butene, and 2,4-dicyano-1-butene.

23. The container of claim 13 wherein said load-bearing lamina is polystyrene.

24. The container of claim 13 wherein said load-bearing lamina is polyvinyl chloride.

25. The container of claim 13 wherein said load-bearing lamina is a copolymer of styrene and acrylonitrile.

26. A rigid injection blow molded plastic container havng laminated walls, the laminated walls comprising:
a. a fluid-barrier lamina of a flexible non-frangible material which is highly impermeable to fluids, and
b. a load-bearing lamina of a frangible plastic material which will delaminate from said fluid-barrier lamina when said container is crushed.

27. The container of claim 26 wherein the container is a bottle.

28. The container of claim 26 wherein the container is a narrow-necked bottle.

29. The container of claim 26 wherein the container is a tub.

30. The container of claim 26 wherein the container is can-shaped.

31. The container of claim 26 wherein said fluid-barrier lamina comprises a polymer containing at least 50 percent by weight of a polymeric nitrile material formed from one or more nitrile monomers of the formula where X is a hydrogen, a halogen, or an alkyl group having up to 4 carbon atoms and one or more alpha-olefinic comonomers.

32. The container of claim 31 wherein said polymer is a polymer formed in the presence of a homopolymer or copolymer of a conjugated diene monomer.

33. The container of claim 26 wherein said load-bearing lamina is polystyrene.

34. The container of claim 26 wherein said load-bearing lamina is polyvinyl chloride.

35. The container of claim 26 wherein said load-bearing lamina is a copolymer of styrene and acrylonitrile.

36. A rigid injection molded plastic container having laminated walls, the laminated walls comprising:
a. a fluid-barrier lamina of a flexible non-frangible material which is highly impermeable to fluids, and b. a load-bearing lamina of a frangible plastic material which will delaminate from said fluid-barrier when said container is crushed.

37. The container of claim 36 wherein the container is a bottle.

38. The container of claim 36 wherein the container is a bottle with a threaded neck.

39. The container of claim 36 wherein the container is a tub.

40. The container of claim 36 wherein the container is can-shaped.

* * * * *

UNITED STATES PATENT OFFICE
CERTIFICATE OF CORRECTION

PATENT NO. : 3,940,001
DATED : February 24, 1976
INVENTOR(S) : Michael E. Kucsma and Albert J. Haefner It is certified that error appears in the above-identified patent and that said Letters Patent are hereby corrected as shown below:

Column 11, line 50, reads "273°F", should read "275°F".

Signed and Sealed this sixteenth Day of August 1977

[SEAL]

Attest:

RUTH C. MASON
Attesting Officer

C. MARSHALL DANN
Commissioner of Patents and Trademarks